(12) United States Patent
Link

(10) Patent No.: US 7,006,158 B2
(45) Date of Patent: Feb. 28, 2006

(54) PROCESS FOR THE IDENTIFICATION OF IDENTICAL TELEVISION OR VIDEO IMAGES

(75) Inventor: Hermann Link, Donaueschingen (DE)

(73) Assignee: XSYS Interactive Research GmbH, Villingen-Schwenningen (DE)

(*) Notice: Subject to any disclaimer, the term of this patent is extended or adjusted under 35 U.S.C. 154(b) by 756 days.

(21) Appl. No.: 09/792,006

(22) Filed: Feb. 23, 2001

(65) Prior Publication Data

US 2002/0126221 A1 Sep. 12, 2002

(30) Foreign Application Priority Data

Feb. 28, 2000 (DE) .......................... 100 09 327

(51) Int. Cl.
*H04N 9/64* (2006.01)
*H04N 5/50* (2006.01)
*H04B 17/02* (2006.01)

(52) U.S. Cl. .................... 348/700; 348/731
(58) Field of Classification Search ........... 348/729, 348/553, 731, 735, 705; 455/135, 133, 502, 455/503, 525, 527
See application file for complete search history.

(56) References Cited

U.S. PATENT DOCUMENTS 4,450,585 A * 5/1984 Bell ........................ 455/135
5,371,550 A * 12/1994 Shibutani et al. ........... 348/570
5,696,866 A * 12/1997 Iggulden et al. ............ 386/46
5,708,477 A   1/1998 Forbes et al.
5,892,550 A * 4/1999 Iwasaki et al. ............ 348/443
6,188,447 B1 * 2/2001 Rudolph et al. ........... 348/729

FOREIGN PATENT DOCUMENTS

| DE | 34 32 848 C2 | 9/1986 |
| DE | 43 09 957 C1 | 7/1994 |
| DE | 198 03 058 C1 | 9/1999 |
| EP | 0 528 105 | 2/1993 |
| EP | 0 593 202 | 4/1994 |
| EP | 0 829 973 | 3/1998 |
| JP | 03280675 A | 11/1991 |
| WO | WO 93/23953 | 11/1993 |
| WO | WO 99/31879 | 6/1999 |

* cited by examiner

*Primary Examiner*—Chris Kelley
*Assistant Examiner*—Erick Rekstad
(74) *Attorney, Agent, or Firm*—Nath & Associates PLLC; Gregory B. Kang; Teresa M. Arroyo

(57) ABSTRACT

In order to be able to identify television or video images (V1,V2) as identical, predeterminable parameters (H1, H2) of the images (V1, V2) to be tested are compared with each other. Images whose parameters, preferably the average brightness (H1, H2), fall within a predeterminable tolerance range, are identified as identical images. Thus, e.g. in a television reception equipment, particularly a mobile one, the images of all receivable transmitters are tested. Images identified as identical are allocated to the same transmitters or the same programs, the channels of which are stored as alternative channels. When there is bad reception or bad image quality an alternative channel is switched to.

13 Claims, 1 Drawing Sheet

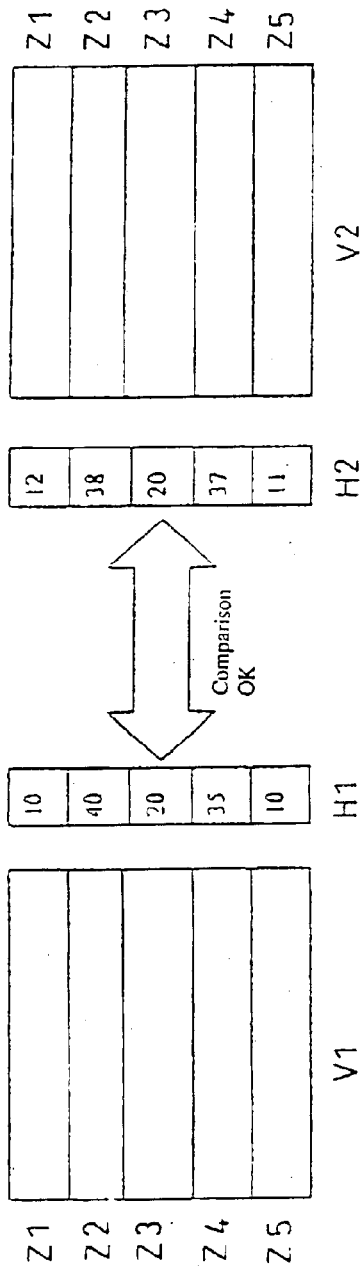
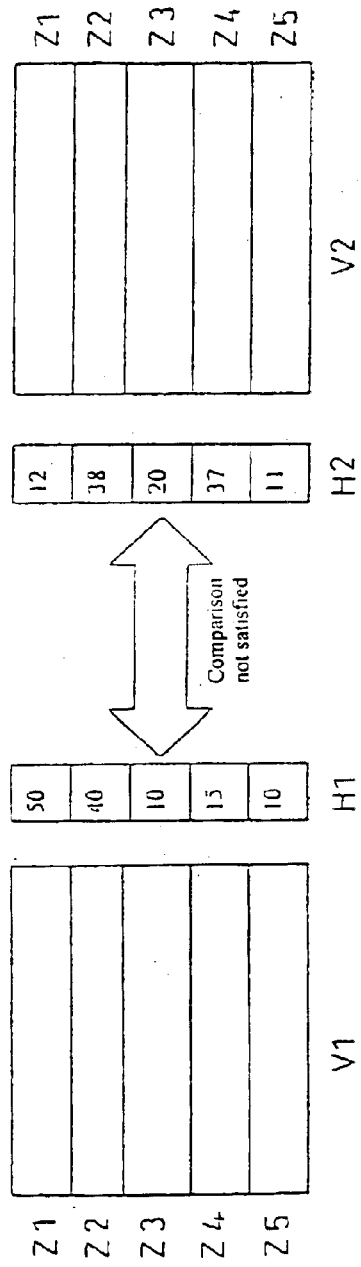

PROCESS FOR THE IDENTIFICATION OF IDENTICAL TELEVISION OR VIDEO IMAGES

The invention relates to a process for the identification of identical television or video images.

In order to decide whether two television or video images are identical, it is necessary for a person to establish by visual inspection whether the two images are identical. In many cases it can however be appropriate to carry out the assessment of whether two television or video images are identical by technical means instead of involving a person.

The invention therefore has as its object to provide a process for the identification of identical television or video images.

The invention, a process for the identification of identical television or video images, attains this object according to claim 1 in that predeterminable parameters of the television or video images to be identified are compared with each other, and that images whose parameters are equal within a predeterminable tolerance range are identified as identical images.

The process according to the invention provides for measuring and comparing with each other predeterminable parameters of the television or video images to be tested to determine whether they are identical. In order to be able to identify two television or video images as identical, the parameters need not be completely identical, which rarely occurs in reality, but rather fall within a predeterminable tolerance range.

The average brightness of the images is particularly suitable as a parameter for testing television or video images. A form of the process according to the invention therefore provides for the determination of the average value of the brightness of the television or video images to be tested to determine whether they are identical. The determined or measured average values are compared with each other. Television or video images with averages of brightness which are equal within a predeterminable tolerance range are identified as identical television or video images.

For example, the brightness of the whole image can be determined. However, the images can be divided into several sections, e.g. into lines or columns. The average value of the brightness is determined for each line or column of an image. The average values of like lines or columns of the individual television or video images to be tested for identity are compared with each other. When the average values of the brightness of the lines or columns agree within a predeterminable tolerance range, the television or video images are identified as identical.

The average values of the brightness of a predeterminable number of lines or columns of two images may lie outside the tolerance range. When, for example, the brightness is equal, within the given tolerance range, in 90% of the lines or columns, the images are identified as identical.

Division of images into sections is discretionary. They can be divided, for example, into squares, or into a central and an edge region.

It is advantageous not to choose a constant tolerance range, but one which changes depending on the average brightness value, as the average value changes. This increases the precision of the process according to the invention. For this purpose, for example, the whole average value range can be divided into individual sections from the smallest to the greatest average value which arises. A tolerance range is allocated to each section. The tolerance ranges allocated to the individual sections can be stored, for example, in a so-called look-up table.

It is furthermore appropriate to set the tolerance range depending on the brightness difference within an image. The tolerance range for an image with sharp contrasts can be greater than for an image with fewer contrasts. Just as for brightness, the whole range of contrast values can be divided into sections from the smallest to the greatest value which arises, a tolerance range being allocated to each section. The correspondence of contrast values and tolerance ranges can likewise be stored, e.g., in a look-up table.

The process according to the invention is described in detail using the Figures in the accompanying drawing.

FIG. 1 shows the brightness values of two images identified as being identical, and FIG. 2 shows the brightness values of two images identified as not being identical.

In FIGS. 1 and 2, two television or video images V1 and V2 are shown, and are respectively divided into five lines Z1–Z5. The average brightness H1 or H2 is determined for each line of each image.

For the two images V1 and V2 shown in FIG. 1, the average brightness values H1 of like lines lie within the predetermined tolerance range; the two images V1 and V2 are therefore identified as identical.

On the other hand, the average brightness values H2 of individual lines of the images V1 and V2 shown in FIG. 2 no longer lie in the predetermined tolerance range. The average brightness values of lines Z1, Z3 and Z4 differ so greatly that they no longer lie in the predetermined tolerance range which can be chosen as, for example, ±5%. With a tolerance range of ±5%, the average brightness value H1 of the one image must lie within the range H2±5%, when H2 is the average brightness value of the other image; otherwise, the two images are identified as not being identical.

The process according to the invention can be used in a mobile television reception equipment to particular advantage.

Reception and reproduction of television images in stationary receiving stations hardly presents difficulties, since the reception conditions are good and remain substantially constant. On the other hand, the reception conditions in a mobile receiving station fluctuate considerably, according to the character of the terrain. If, for example, the mobile receiving station is located in a mountainous landscape, echoes can considerably interfere with reception; in the radio shadow of mountains or hills, the radio connection can even completely break down, so that only noise is visible on the screen instead of a television image.

Meanwhile motor vehicles, e.g., passenger cars and tour buses, and also railroad vehicles, are equipped with television receivers and screens, in order either to be able to display information such as traffic reports transmitted by videotext, or to entertain travelers with television programs. Because of the reception conditions which in some circumstances fluctuate considerably in a moving receiving station due to the terrain being traveled over, the eyes of the traveling television viewers are severely strained in an unpleasant manner, since the image quality can fluctuate to a substantial degree. If the vehicle passes through a radio shadow, for example, the observer sees only noise on the screen. Viewing a television program with such interruptions is more likely to fatigue than entertain the viewer.

A development of the invention therefore provides for testing the television images of all television transmitters or television programs which can be received by television reception equipment, and in particular mobile equipment, to determine whether they are identical, according to the process of the invention.

The channels on which television images received were identified as identical are stored in a memory as alternative channels. If the quality of the television images provided by the television transmitter in use falls, for example, below a predeterminable quality level, the television reception equipment is then tuned to one of the alternative channels. If this channel also delivers television images of insufficient quality, changeover to another alternative channel is effected, until a channel is found on which television images of satisfactory quality are received. The quality of the received television images can be determined according to, e.g., the process described in the International Application WO 99/17557.

When the average brightness lies below a predeterminable threshold value, it is not appropriate to carry out any further comparisons, since significant differences can no longer be measured.

The process according to the invention can be used particularly advantageously in mobile television reception equipment in order to seek the best receivable television transmitter, but is in no way limited to this field of use. For example, the process according to the invention makes it possible to find, from plural television or video images, those which are identical and hence belonging to the same transmitter or the same television program.

REFERENCE LIST

H1, H2 average brightness
V1, V2 television or video image
Z1–Z5 line

What is claimed is:

1. Process for the identification of identical television or video images (V1, V2), wherein predeterminable parameters (H1, H2) of the television of video images (V1, V2) to be tested are compared to each other, and that images (V1, V2) whose parameters (H1, H2) are equal within a predeterminable tolerance range are identified as identical images (V1, V2), wherein the average value of the brightness (H1, H2) of a television or video image (V1, V2) is determined as the parameter, and wherein the tolerance range is set depending on the brightness difference of a television or video image.

2. Process according to claim 1, wherein the television or video images (V1, V2) or their predeterminable parameters (H1, H2) are temporarily stored in a memory.

3. Process according to claim 1, wherein the average values of the brightness (H1, H2) of predeterminable sections (Z1–Z5) of the television or video image (V1, V2) are determined as the parameter.

4. Process according to claim 3, wherein the sections are lines (Z1–Z5) or columns of predeterminable height or width.

5. Process according to claim 3, wherein the sections are squares.

6. Process according to claim 3, wherein the average value of the brightness of the central region of the television or video image (V1, V2) is determined.

7. Process according to claim 3, wherein the average value of the brightness of the edge region of the television or video image (V1, V2) is determined.

8. Process according to claim 1, wherein the tolerance range is set depending on the average value of the brightness.

9. Process for the identification of identical television or video images (V1, V2), wherein predeterminable parameters (H1, H2) of the television of video images (V1, V2) to be tested are compared to each other, and that images (V1, V2) whose parameters (H1, H2) are equal within a predeterminable tolerance range are identified as identical images (V1, V2), wherein the average value of the brightness (H1, H2) of a television or video image (V1, V2) is determined as the parameter, and wherein no comparison is carried out when the average value of the brightness lies below a predeterminable threshold value or when no brightness difference is detected.

10. Process according to claim 9, wherein in television reception equipment, the predeterminable parameters of television images broadcast from television transmitters on different channels are compared with each other, and television images identified as identical are allocated to the same transmitters or to transmitters broadcasting the same program.

11. Process according to claim 10, wherein several television images of a channel, or their predeterminable parameters, are stored in a memory and the parameters compared to each other.

12. Process according to claim 10, wherein channels identified as identical or broadcasting the same program are stored in a memory as alternative receiving channels.

13. Process according to claim 12, wherein, when there is interference with reception or impaired quality of the television image, the television reception equipment is tuned to one of the stored alternative receiving channels.

* * * * *